United States Patent Office 3,592,874
Patented July 13, 1971

3,592,874
UNSATURATED POLYESTERS CONTAINING CHEMICALLY INCORPORATED COBALT
Johannes Reese and Hermann Hotze, Wiesbaden-Biebrich, Germany, assignors to Chemische Werke Aktiengesellschaft, Wiesbaden-Biebrich, Germany
No Drawing. Filed Aug. 30, 1968, Ser. No. 756,406
Claims priority, application Germany, Sept. 6, 1967,
P 16 69 859.2
Int. Cl. C08f *21/00, 21/02*
U.S. Cl. 260—870                                    6 Claims

ABSTRACT OF THE DISCLOSURE

A process for the manufacture of a hardenable polyester composition by (A) transesterifying high molecular weight polyesters of isophthalic or terephthalic acid or of both acids with a polyhydric alcohol in the presence of a cobalt salt and chemically building in the cobalt into the polyester, (B) further esterifying the product of (A) with units of an unsaturated polycarboxylic acid or a mixture thereof with an alcohol and (C) admixing the product of (B) with an unsaturated copolymerizable monomer to yield a composition hardenable by a peroxide catalyst without the further addition of an accelerator.

---

This invention relates to a process for preparing polyesters. In particular the invention relates to a transesterification process for preparing unsaturated polyester resins.

Maiofis Antonow and Bolotin ("Die Einführung neuer emaillierter Leiter und die Vervollkommnung der Emailletechnologie," 1961, pp. 43 and 44) have described the preparation of saturated polyester resins by reacting high molecular weight polyterephthalates, which may be obtained as waste products in industrial processes, with glycerol at 260–280° C. in the presence of lead monoxide. However, this reaction does not always take place rapidly and, on occassions a turbid resin may be obtained. High molecular weight polyterephthalates have been reacted with polyhydric, particularly dihydric, alcohols, preferably those having boiling points above 200° C. in the presence or absence of a catalyst, such as sodium methoxide. The products obtained in such reactions are reacted with saturated or unsaturated dicarboxylic acids and then copolymerised with polymerisable monomers with the addition of e.g. benzoyl peroxide.

It has now been found that the preparation of unsaturated polyester resins may be improved if the transesterification is carried out in the presence of at least one cobalt salt as a catalyst.

According to the present invention therefore there is provided a process for the preparation of hardenable unsaturated polyester resin composition which includes the steps of (a) transesterifying a high molecular weight polyester of isophthalic and/or terephthalic acid with a di- or polyhydric alcohol having up to 18 carbons atoms in the presence of at least one cobalt salt at a temperature of above 200° C. so that the cobalt becomes chemically incorporated into the polyester; (b) further esterifying the transesterification product of step (a) with either (i) units of at least one mono-olefinically unsaturated polycarboxylic acid or
(ii) units of at least one mono-olefinically unsaturated polycarboxylic acid with at least one alcohol and (c) admixing the reaction product obtained with a monoolefinically unsaturated copolymerizable monomer to yield a composition hardenable by the addition of a peroxide catalyst and without the further addition of an accelerator.

In the process according to the invention, cobalt becomes chemically incorporated into the polyester in step (a). Step (b) takes place at a lower temperature than has previously been necessary and an unsaturated polycarboxylic acid or its esters or anhydride may be used in this step. Generally these esters contain at least a substantially equivalent amount of polyhydric alcohol units. The polyester resins obtained may be dissolved in polymerizable monomers and completely hardened to give a clear product.

In the process according to the invention the cobalt salts not only act as transesterification catalysts, but also, during the later hardening of the polyesters, act as hardening accelerators. Transesterification in the first stage can take place in a relatively short time, for example within a few minutes. The polyesters prepared by the process according to the invention can be stored for long periods of time. Polyester resins to which cobalt salts are added subsequently do not show the improved characteristics displayed by resins prepared by the process according to the invention in that after addition of peroxide catalyst, the time necessary for gelling may become longer the longer the resin containing the cobalt salt is stored and in such cases the polyesters may no longer be hardenable.

The cobalt salt may be a salt of e.g. a half-ester of a dicarboxylic acid, preferably a phthalic acid half-ester such as cobalt-methyl, -ethyl-, -propyl- or -butylphthalate or a salt of a hydroxymonocarboxylic acid of which the hydroxy groups are linked to aliphatic or cycloaliphatic radicals having from 2 to 20 carbon atoms, such as ricinoleic acid, hydroxyestearic acid, preferably however, lactic acid and hydroxypivalic acid. The last-named cobalt salts can be prepared in any convenient manner, e.g. by double reaction, firstly by reacting a hydroxy-monocarboxylic acid with sodium hydroxide to obtain the sodium salt. Thereafter this sodium salt is further reacted with a soluble cobalt salt. They can also be prepared by reaction of a hydroxymonocarboxylic acid with cobalt carbonate or the like.

In the transesterification reaction smaller quantities of cobalt salt are required than are required for hardening. The cobalt content in the reaction mixture may be between about 0.0001 and 1 percent by weight, but usually it does not essentially vary from the range of 1 to 500 mg./kg. of the reaction mixture and is preferably from 50 to 150 mg./kg. of the reaction mixture. The optimum quantity for a particular resin will depend, to some extent, on the polyester used, however, it should be sufficient to act as an accelerator for the hardening. If the polyester is dissolved in the partially polymerisable monomers the cobalt proportion can be relatively small for example from 0.005 to 1, preferably from 0.01 to 1% by weight, based on the total weight of the transesterification mixture. However, it is advantageous during the transesterification to work with a larger amount of cobalt salt than is necessary for the reaction in the first stage. The incorporation of cobalt salts into the polyester does not preclude the additional use of other accelerators, such as vanadium salts and/or tertiary amines or the like for the hardening to produce resins suitable for particular purposes.

By varying the manner in which the cobalt salt is incorporated into the resin or by varying the quantity incorporated it is possible to vary the hardening times. The addition of the cobalt salts can take place during the preparation of the unsaturated polyesters e.g. in the form of a solution in a dihydric alcohol at the start of the reaction or in portions added during the reaction.

The process according to the invention permits the hardening of solutions of unsaturated polyesters in partially polymerisable monomers, using relatively small amounts of the incorporated cobalt salt. As the cobalt salt is incorporated in a certain quantity during manufacture of the resin it is not possible for the user to select incorrect proportions, and so the working reliability during hardening is greater. On the other hand the user may vary the hardening time by the addition of further accelerators. The hardening speed can also be varied by varying the peroxide content. Furthermore, due to the small amount of cobalt a hardened product of a very light colour is obtained.

Suitable vinyl or vinylidene compounds for polymerisation include vinyltoluene, vinylpyrrolidone, styrene, halogenated or substituted styrenes, such as α-methylstyrene, α-chlorostyrene, divinylbenzene, alkenyl esters of saturated carboxylic acids, such as vinylacetate, vinylpropionate, allylacetatae, allylpropionate, diallyl-maleate, fumarate, -succinate, -adipate, -azelate, -sebacate or -phthalate; triallylphosphate, triallylcyanurate, acrylic and methacrylic acids and their derivatives, such as esters, amides, alkylolamides which can, if desired, be etherified, such as methyl-, ethyl-, propyl-, (primary, secondary, tertiary or iso-) butyl-, amyl-, hexyl-, octyl-, hydroxyalkyl-, allyl-acrylate or methacrylate, diallyl itaconate, acrylonitrile or a mixture of such monomers. The preferred monomers are therefore compounds in which the —CH=CH$_2$ group is linked to an electron-donating radical, such as a benzene nucleus, an ester group or a nitrile group. The preferred monomers are those which contain no conjugated double bonds and which are normally liquid.

The amount of olefinic monomers may be varied within wide limits depending on the intended use, It often amounts to between 30 and 50% by weight of the polyester resin; however, it is possible to use considerably larger e.g. 80%, or smaller amounts, e.g. 10%. Furthermore, such monomers may also be used if further components are incorporated, which give the polyesters particular properties, e.g. phosphorus and/or halogen compounds for obtaining flame-resistance.

Saturated or olefinically-unsaturated, straight-chained or branched aliphatic or cycloaliphatic dihydric or polyhydric alcohol may be used in step (a) as transesterification component. Preferably higher-boiling dihydric alcohols, and advantageously those having a boiling point of at least about 200° C. are used, preferably oligomer dihydric alcohols, for example di-, tri- or poly-ethylene glycols or higher dihydric alcohols, such as 2,2-dimethyl-propane diols, trimethylpentane diols, hexane diols or decane diols. Other suitable alcohols include glycerol, trimethylol ethane, trimethylol propane, bis-(oxocyclohexyl)-alkanes as well as addition products of alkylene oxides, such as ethylene, propylene or butylene-oxides, with dihydric alcohols or with phenols, such as resorcinol, hydroquinone, 4,4'-dihydroxydiphenylmethane, -ethane, -propane, or other homologues. When such high boiling dihydric alcohols are used in step (a) the reaction takes place particularly smoothly. The total amount of dihydric alcohols used is advantageously selected in a way such that at least one and at most 10 alcoholic hydroxy groups react with each mol of terephthalate or isophthalate. It is also possible to use as dihydric alcohols higher boiling esters of a dicarboxylic acid which esters have 2 free OH groups, e.g. bis-(ethylene glycol)-maleate or the like.

In step (b) as an esterification component lower boiling dihydric alcohols and unsaturated dicarboxylic acids or anhydrides and/or a previously reacted mixture may be used. The dicarboxylic acids are preferably maleic or fumaric acids although other suitable acids include itaconic, citraconic, mesaconic, aconitic, ethylmaleic, dichloromaleic acids or their anhydrides or the like and/or esters which can be transesterified with volatile alcohols. The molar ratio of unsaturated acid to iso- or terephthalic acid can be varied within wide limits. The dicarboxylic acid used in step (b) can e.g. be used in a quantity of at least 2, preferably between 3 and 10 mol to every 3 molecular units of iso- or terephthalic acid contained in the ester. Instead of the free acid it is also possible to use, if desired, esters having two free carboxyl groups, e.g. ethylene glycol bismaleate. The polyesters obtained in step (b) should contain at least about 25 mol percent of the total acid and alcohol components and, the acid components should preferably be olefinically unsaturated compounds. The reaction components used in step (b) can also be used in association with other carboxylic acids, e.g., polybasic aromatic carboxylic acids which do not contain acetylenic bonds e.g. iso- or terephthalic acid, trimellitic acid, pyromellitic acid, aliphatic dicarboxylic acids such as adipic, succinic or sebacic acids, hydroxycarboxylic acids, 3,6-endomethylene tetrahydrophthalic acid or hexachloro-endo-methylene-hexahydrophthalic acid, etc.

Whilst step (a) is performed at a temperature of over 200, preferably at approximately 200 to 250° C. it is usual to effect step (b) at a lower temperature in order to avoid undesirable secondary reactions of the unsaturated polycarboxylic acids and alcohols taking place, e.g., a suitable temperature range is from 150 to 220° C., preferably 170 to 210° C. The di- or polyhydric alcohols used in step (a) can be used for the reaction in step (b) generally, however, lower boiling glycols e.g. ethylene glycol, the propane diols, butanediols or the like are used. The alcohols used in step (b) may have a boiling point between 150 and 220° C., preferably between 170 and 210° C., and 2 to 12 carbon atoms. Alternatively an alcohol may be used together with an unsaturated polycarboxylic acid in step (b), e.g. 1,2-propane diol component together with maleic anhydride. The use of propane diol assists the isomerisation of maleic acid to fumaric acid and thereby increases the reactivity. Step (b) also takes place very rapidly.

The esterification in step (b) may be effected in the usual manner, e.g. in the melt or by the adidtion of solvents such as benzene, toluene, the various xylenes, chlorobenzene or mixtures of such solvents which form azeotropes with the water liberated so that the water evolved may be continually removed during the reaction and the distilled solvent being returned into the reaction vessel.

The products obtained in step (b) can be diluted with unsaturated polymerisable monomers, e.g. styrene and/or acrylates or methacrylates or with other derivatives of acrylic or methacrylic acid and stored for several months without causing turbidity or precipitation of the polyester as is observed in many cases in conventional polyester resins based on ortho-, iso- or terephthalic acids. The products obtained in step (b) are preferably subjected to cold hardening initially i.e. at ambient or only slightly elevated temperatures. Advantageously these products are then further heated at temperatures of 80 to 150, preferably about 120° C., for several hours, e.g. from ½ to 10 hours.

Complete hardening of the products together with the unsaturated monomers is usually possible without additional accelerators due to the cobalt salt incorporated into the polyester molecule. Solutions of the unsaturated polyesters prepared according to the invention in partially polymerisable monomers can be converted into moulded articles only in the usual manner by simply adding peroxides and without adding an accelerator. They have proved particularly suitable for use for cast resins or glass fibre-reinforced plastics.

Suitable catalysts for the cold-hardening process are hydroperoxides or peroxide mixtures containing such hydroperoxides in particular e.g. cyclohexanone peroxide, cumenehydroperoxide and methyl ethyl ketone. If in special cases hardening is effected with the aid of heat, it is also possible to use the usual dialkyl- or diacyl peroxides. Other suitable hardening catalysts are e.g. benzoyl peroxide, 2,4-dichlorobenzoyl peroxide, acetyl peroxide, tert.-butyl peroxide or -hydroperoxide, succinyl peroxide, lauroyl peroxide, cyclohexylhydroperoxide, methylisobutyl ketone peroxide, dibenzaldiperoxide, 2,2-bis-(tertiary butylperoxy)-butane, tert. butyl peracetate, tert. butyl perbenzoate, ditertiary butyldipersuccinate, -diperphthalate, -diperterephthalate or azoisobutyronitrile. Although it is generally not necessary, accelerators can at times also be used, such as tertiary amines, dimethyl aniline, dimethyl-p-toluidine or the like, or heavy metal salt of organic acids e.g. cobalt naphthenate or -octoate. In all cases, mixtures of several components can be used, thus several acids, alcohols, esters, monomers etc. may be used.

The polyesters prepared according to the invention can be inhibited in the usual manner with stabilisers e.g. hydroquinone, pyrocatechol, phenol derivatives or the like. In addition, the products can be combined with any fillers or reinforcing agents, for example rock powder, lime, mineral fibres such as glass fibres, asbestos, textile fibres and strips or the like. In this way it is possible to produce glass-fibre reinforced laminates. After hardening, the products prepared have good mechanical properties and good chemical stability. They are also suitable as coating agents, coverings or impregnating substances, as well as for producing moulding compounds, cast and moulded articles, e.g. by pressing or moulding. The impact strength and flexural strength of the glass fibre laminates obtained after curing makes these suitable materials for vehicle manufacture. They are also suitable as binding agents of the most varied types e.g. mineral and textile fibres or the like. If the polyesters contain phosphate and/or halogen compounds, the process according to the invention can also be used for producing difficultly combustible products.

The process according to the invention makes possible the working up of high molecular terephthalates obtained in the form of waste from fibres, foils or granules to high-grade products with a multiplicity of uses, within an industrially acceptable time whereby at the same time a poly-ester having a hardening accelerator incorporated therein is obtained.

In order that the invention may be well understood the following examples are given by way of illustration only:

EXAMPLE 1

In an apparatus suitable for the preparation of unsaturated polyester resins, consisting of a three-necked flask fitted with a condenser, a feed pipe for an inert gas, a thermometer and a dropping funnel, 300 g. of polyethylene terephthalate and 207 g. of diethylene glycol are heated under reflux with 2.5 g. of cobalt butyl phthalate to 230° C.

After breakup of the terephthalate, which takes place in less than 1 hour, 114 g. of 1,2-propane-diol are added to the reaction mixture, whereupon the temperature drops to 200° C. at which value it is held for 30 minutes. Then, at 175 C., 294 g. of maleic anhydride are added followed by 100 ml. of toluene. Esterification is effected by continuous removal of water from the refluxing toluene until, after two hours, an acid number of 25 is obtained. A conventional stabiliser e.g. hydroquinone is added and the viscosity of the mixture is adjusted by addition of styrene to 1000–1100 cp. 1295 g. of the styrene solution are obtained.

The pot life of this polyester resin after the addition of 1.8% of 50% methyethylketone-peroxide, is 13–16 minutes. Hardening takes place at ambient temperature. The product is then further heated for 10 hours at 120° C. whereupon the characteristics of the cured polyester resin determined on standard bars are as follows:

Flexural strength 1200 kp./cm.$^2$
Impact strength 15 cm. kp./cm.$^2$
Martens temperature 71° C.

The cured resin showed good stability to acid, alkali and methylene chloride. The water absorption of the test bars is below 1% (after 5 hours in boiling water).

EXAMPLE 2

Using the apparatus described in Example 1, 300 g. of polyethylene terephthalate, obtained as waste during fibre manufacture, are transesterified with 292 g. of triethylene glycol at 240° C. in the presence of 2.5 g. of cobalt butyl phthalate and then further esterified with 114 g. of 1,2-propanediol and 294 g. of maleic anhydride until an acid number of 25 is obtained. After the addition of 0.1 g. of hydroquinone the ester is introduced into 500 g. of styrene. One obtains 1358 g. of the solution. After curing with 2% cyclohexanone-peroxide a product having the following characteristics is obtained:

Flexural strength 1100 kp./cm.$^2$
Impact strength 20 cm. kp./cm.$^2$
Martens temperature 52° C.

EXAMPLE 3

Using the apparatus described in Example 1, 300 g. of polyethylene terephthalate and 207 g. of diethylene glycol are heated to 230° C. in the presence of 1.5 g. of cobalt ethyl phthalate.

After breakup of the terephthalate, 114 g. of 1,2-propane-diol are added and the temperature maintained for 30 minutes at 200° C. 294 g. of maleic anhydride are then added at 175° C. and the mixture esterified for 1½ hours to an acid number of 25. The polyester is mixed with 0.1 g. of hydroquinone and dissolved in 450 g. of styrene to yield 1295 g. of solution. The pot life of this resin with 1.8% methylethylketone peroxide is 45 minutes. The product, cured in the manner described in Example 1, has the following characteristics Flexural strength 1100 kp./cm.$^2$
Impact strength 20 cm. kp./cm.$^2$
Martens temperature 57° C.

EXAMPLE 4

The resin described in Example 1 was dissolved in a mixture of methyl methacrylate/styrene 1:1 and 1300 g. of the solution obtained. The characteristics of the product, cured in the manner described in Example 1 are as follows:

Flexural strength 1550 kp./cm.$^2$
Impact strength 18 cm. kp./cm.$^2$
Martens temperature 57° C.

EXAMPLE 5

Using the apparatus described in Example 1, 300 g. of polyethylene terphthalate are heated with 106 g. of diethylene glycol to 230° C. in the presence of 2.5 g. of cobalt methyl phthalate. After breakup of the terephthalate 61 g. of 1,2-propane-diol are added together with 147 g. of maleic anhydride and the mixture esterified to an acid number of 20. The polyester is mixed with a conventional stabilizer and dissolved in 450 g. of styrene to yield 974 g. of solution. The characteristics of the product, cured in the manner described in Example 1 are as follows:

Flexural strength 1100 kp./cm.$^2$
Impact strength 20 cm. kp./cm.$^2$
Martens temperature 65° C.

EXAMPLE 6

Using the apparatus described in Example 1, 300 g. of polyethylene terephthalate are heated with 390 g. of polyethylene glycol having an average molecular weight of 200 in the presence of 1 g. of cobalt butyl phthalate at 240° C. After breakup of the terephthalate, 114 g. of 1,2-propane-diol are added followed by 294 g. of maleic anhydride and the mixture esterified to an acid number of 25. After stabilisation with 0.1 g. of hydroquinone the polyester is dissolved in 550 g. of styrene to yield 1500 g. of solution. The pot life of the resin with 1.8% methylethylketone peroxide is 15 to 17 minutes. The product, cured in the manner described in Example 1, has the following characteristics:

Flexural strength 1000 kg./cm.$^2$
Impact strength 28 cm. kp./cm.$^2$
Martens temperature 45° C.

EXAMPLE 7

Using the apparatus described in Example 1, 300 g. of polyethylene terephthalate were heated with 285 g. of 2,2,4-trimethyl-1,3-pentane-diol in the presence of 2.5 g. cobalt butyl phthalate at 230° C. After breakup of the terephthalate 114 g. of 1,2-propane-diol are added, the temperature held at 200° C. for 30 minutes, and then 294 g. of maleic anhydride are added. Esterification is effected until an acid number of 30 is obtained. After adding 0.1 g. of hydroquinone the unsaturated polyester resin is diluted with styrene to a viscosity of 100–1100 cp. 1365 g. of the solution are obtained.

The pot life with 1.8% methylethylketone peroxide is 10 minutes. The characteristics of the product, cured in the manner described in Example 1 are as follows:

Flexural strength 700 kp./cm.$^2$
Impact strength 9 cm. kp./cm.$^2$
Martens temperature 94° C.

EXAMPLE 8

Using the apparatus described in Example 1, three resins are prepared from 1.5 mol of polyethylene terphthalate and 1.95 mol of diethylene glycol by heating under reflux at 230° C. in the presence of a cobalt salt. Resin A, B and C having a cobalt content of 0.037% were prepared by incorporating:

(A) Cobalt butyl phthalate
(B) Cobalt dilactate
(C) Cobalt dioxypivalate

After breakup of the terephthalate, which takes place in less than 1 hour, 1.5 mol of 1,2-propanediol are added to the reaction mixture whereupon the temperature falls to 200° C. at which value it is held for 30 minutes. Then, at 175° C., 3 mol of maleic anhydride are added followed by 100 ml. of toluene. Esterification is effected by continuous removal of water from the refluxing toluene until, after 2 hours, and acid number of 25 is obtained.

A conventional stabiliser e.g. hydroquinone is added and the viscosity of the mixture is adjusted by addition of styrene in a weight ratio of 62 parts polyester: 38 parts styrene to 1000–1100 cp. 1300 g. of the solution are obtained. The cobalt content of these solutions amounts to 0.024% by weight.

If the solution is catalyzed with 1% cyclohexanone peroxide (50% by weight in dimethyl phthalate) the following gelling and hardening times are obtained.

| Test piece | A | B | C |
|---|---|---|---|
| Gelling time | 45 min | 29 min. 15 sec | 32 min. 40 sec. |
| Hardening time | 73 min. 35 sec | 55 min | 55 min. |

EXAMPLE 9

Using the apparatus described in Example 1, 300 g. of polyethylene terephthalate are heated under reflux at 230° C. with 207 g. of diethylene glycol and 1.2 g. of cobalt dilactate. After breakup of the terephthalate, which occurs in less than 1 hour, 114 g. of 1,2-propane-diol are added to the reaction mixture, whereupon the temperature falls to 200° C. at which value it is held for 30 minutes. 294 g. of maleic anhydride are added at 175° C. and the resin is further processed in the manner described in Example 8. 1265 g. of the styrene solution are obtained, the cobalt content of the solution being 0.081% by weight.

If the solution is catalyzed with 1% of cyclohexanone peroxide (50% by weight in dimethyl phthalate) a gelling time of 29 min. 15 sec. and a hardening time of 55 min. are obtained.

We claim:

1. A process for the manufacture of a hardenable unsaturated polyester resin composition, which comprises transesterifying a high molecular weight polyester of isophthalic acid or terephthalic acid or of a combination of both acids with a polyhydric alcohol at a temperature of above 200° C. in the presence of such an amount of at least one cobalt salt selected from the group consisting of (a) a half ester of a phthalic acid the alcoholic component of which having 1 to 4 carbon atoms or (b) a cobalt salt of a hydroxy monocarboxylic acid in which the hydroxy groups are linked to aliphatic or cycloaliphatic radicals having 2 to 20 carbon atoms as a transesterification catalyst that the quantity of cobalt in the reaction mixture is between about 0.0001 and 1 percent by weight, whereby the cobalt is chemically built in into the polyester and then esterifying the transesterification product with (a) units of at least one mono-olefinically unsaturated polycarboxylic acid or (b) a mixture thereof with at least one alcohol such that the polycarboxylic acid units are present in a proportion of 2 to 10 mols to 3 molecular units of the sum of isophthalic and terephthalic acid units, and then admixing the reaction product thus obtained with a monoolefinically unsaturated copolymerizable monomer in a quantity of 10 to 86 percent by weight, based on the finally esterified product, to yield a composition hardenable by the addition of a peroxide catalyst and without the further addition of an accelerator.

2. A process as claimed in claim 1, wherein the cobalt salt is selected from the group consisting of lactic acid and hydroxy pivalic acid.

3. A process as claimed in claim 1, wherein waste of high molecular weight polyesters is used as starting material.

4. A process as claimed in claim 1, wherein the high molecular weight polyester is transesterified with a polyhydric alcohol having a boiling point of above 200° C. and selected from the group consisting of (1) an oligomer dihydric alcohol and (2) an ester with 2 free hydroxy groups of a dicarboxylic acid.

5. A process as claimed in claim 1, wherein the quantity of cobalt in the reaction mixture is between about 0.005 and 1.0 percent by weight.

6. A process as claimed in claim 1, wherein the units of the monoolefinically unsaturated polycarboxylic acid are provided by an anhydride thereof.

References Cited

UNITED STATES PATENTS

| 3,151,170 | 9/1964 | Davis et al. | 260—610 |
| 3,239,581 | 3/1966 | Raichle et al. | 260—863 |
| 3,427,267 | 2/1969 | Stieger et al. | 260—22 |

FOREIGN PATENTS

| 1,474,607 | 3/1967 | France. |
| 1,148,033 | 5/1963 | Germany. |

MELVIN GOLDSTEIN, Primary Examiner

U.S. Cl. X.R.

161—195; 260—40, 75, 76, 868, 869

UNITED STATES PATENT OFFICE
CERTIFICATE OF CORRECTION

Patent No. 3,592,874      Dated July 13, 1971

Inventor(s) JOHANNES REESE and HERMANN HOTZE

It is certified that error appears in the above-identified patent and that said Letters Patent are hereby corrected as shown below:

Col. 1, lines 5 and 6, change "Aktiengesellschaft"

to --Albert-- to conform to the assignment recorded October 16, 1970 on Reel 2655, Frame 740

Signed and sealed this 13th day of November 1973.

(SEAL)
Attest:

EDWARD M. FLETCHER, JR.
Attesting Officer

RENE D. TEGTMEYER
Acting Commissioner of Patents